United States Patent
Greb et al.

(10) Patent No.: US 12,036,710 B2
(45) Date of Patent: *Jul. 16, 2024

(54) HOT-RUNNER ASSEMBLY WITH COMPACT ELECTRIC ACTUATOR

(71) Applicant: Incoe Corporation, Auburn Hills, MI (US)

(72) Inventors: Scott Greb, Washington Township, MI (US); Anton Joerg, Grossostheim (DE); Christian Striegel, Hainburg (DE)

(73) Assignee: Incoe Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,670

(22) Filed: Nov. 12, 2021

(65) Prior Publication Data

US 2023/0150179 A1 May 18, 2023

(51) Int. Cl.
*B29C 45/28* (2006.01)
*B29C 45/76* (2006.01)

(52) U.S. Cl.
CPC ........ *B29C 45/281* (2013.01); *B29C 45/7613* (2013.01); *B29C 2045/2824* (2013.01); *B29C 2045/2865* (2013.01); *B29C 2945/76083* (2013.01); *B29C 2945/76545* (2013.01)

(58) Field of Classification Search
CPC .......... B29C 45/281; B29C 2045/2824; B29C 2045/2865
See application file for complete search history.

(56) References Cited

U.S. PATENT DOCUMENTS

| | | |
|---|---|---|
| 9,138,928 B2 | 9/2015 | Joerg |
| 9,849,618 B1 | 12/2017 | Tooman et al. |
| 2012/0231111 A1 | 9/2012 | Catoen |
| 2015/0251346 A1 | 9/2015 | Bazzo |
| 2016/0288389 A1 | 10/2016 | Olaru |
| 2019/0184617 A1 | 6/2019 | De Oliveira Antunes |
| 2021/0107190 A1 | 4/2021 | Greb |

FOREIGN PATENT DOCUMENTS

WO   WO 2015/183332 A1 * 12/2015 ............ B29C 45/28

OTHER PUBLICATIONS

International Search Report issued in App. No. PCT/US2022/049113, mailing date Mar. 10, 2023, 25 pages.

* cited by examiner

*Primary Examiner* — James Sanders
(74) *Attorney, Agent, or Firm* — Gunther J. Evanina; BUTZEL LONG (57) ABSTRACT

A hot-runner injection molding apparatus that facilitates use of actuators in a compact design includes a hot-runner manifold defining resin channels for conveying resin to nozzles that serve as conduits for introducing liquid resin into a mold cavity, a valve pin configured for linear movement along a longitudinal axis of the nozzle to control flow of liquid resin through the nozzle, and an actuator having a housing, wherein the valve pin is coupled to a drive shaft within the housing.

31 Claims, 8 Drawing Sheets

HOT-RUNNER ASSEMBLY WITH COMPACT ELECTRIC ACTUATOR

FIELD OF THE DISCLOSURE

This disclosure pertains to a hot-runner injection molding apparatus having an actuator.

BACKGROUND OF THE DISCLOSURE

In a hot-runner injection molding apparatus, the liquid resin (molten plastic) is maintained in a molten state within channels defined in a heated manifold. The channels convey the molten plastic material from an injection molding machine to one or more nozzles that convey the molten plastic to at least one mold cavity via gates defined at an interface between the nozzle and the mold cavity. After the mold cavity is filled, only the mold cavity is cooled to allow removal of a solid molded part. The resin in the manifold channels and nozzles are maintained at a temperature sufficient to keep the plastic in a liquid state, thus reducing cycle time and waste as compared with cold runner injection molding apparatuses, wherein the resin conveying channels are defined within the mold plates.

Because of the susceptibility of electric actuators to degradation and failure when exposed to the high temperatures needed at the hot-runner manifold, hydraulic or pneumatic actuators are typically employed in hot-runner injection molding apparatus to control the flow of molten resin into the mold cavity (or cavities). In these hot-runner injection molding apparatuses employing electric actuators, the electric actuators are positioned remotely from the manifold and/or are provided with external cooling means (e.g., a cooled plate between the manifold and actuator), adding considerable complexity and expense as compared with the more conventionally used pneumatic or hydraulic actuators.

Despite these generally recognized disadvantages with electric actuators, they also have advantages, including the ability to more precisely control valve pin movement and positioning, which in turn can have associated advantages pertaining to part quality and production efficiency.

Electric actuators for controlling the valve pin positions of injection molding systems offer significant advantages in certain applications, including cleaner operation by avoiding the inevitable leaks that occur with hydraulic actuators, and more precise control over valve pin position and flow of resin into the mold cavities. Cleanliness is an important consideration and advantage in the manufacture of injection molded items used for pharmaceutical and medical products. Precise control of melted resin flowing into a mold cavity can also be extremely beneficial to avoid or minimize imperfections, such as flow lines (wavy patterns or discolorations) caused by more rapid cooling in thinner sections of the molded part, and knit lines (where two or more flows into a mold meet). These imperfections, which do not typically affect functionality or integrity, but can cause undesirable or even unacceptable aesthetics.

While electric actuators have advantages with respect to flow control and cleanliness, conventional electric actuators used for injection molding systems are bulkier than the hydraulic actuators currently used in most injection molding systems, which have a transmission for converting rotary motion of the output shaft of the electric motor into linear movement to facilitate linear movement of the valve pin along a longitudinal axis of a nozzle directing resin flow into the mold. In conventional electric actuators used for injection molding, the transmission is external to the motor assembly and is often located in a housing separate from the motor housing. As a result, assembly of the injection molding apparatus becomes more cumbersome, and the transmission occupies volume that limits or restricts flexibility in actuator positioning, and consequently, flexibility in the design of the molding apparatus.

SUMMARY OF THE DISCLOSURE

Described herein are injection molding systems employing a compact electric motor valve actuator in which the valve pin for controlling resin flow to the mold cavity is configured to directly or indirectly couple the head of the valve pin to a drive shaft located within a space defined within the internal boundaries (or surfaces) of the rotor of the electric motor.

In certain aspects of the disclosure, the actuator can be an electric, pneumatic or hydraulic actuator including a housing or actuator body having an integral cooling block or plate with internal conduits for circulating a coolant liquid (e.g., water).

In other aspects, the actuator can be an electric, pneumatic or hydraulic actuator that is supported on an insulating member that positions the actuator so that there is a gap between a surface of the actuator housing facing the hot-runner manifold and the surface of the insulating support plate facing the actuator housing.

In a further aspect of the disclosure, a compact contactless linear position sensor is located in the actuator housing, and configured to precisely monitor the position of the valve pin to facilitate precise control of resin flow to a mold cavity. The actuator can be an electric, pneumatic or hydraulic actuator.

DETAILED DESCRIPTION

Figure 1:
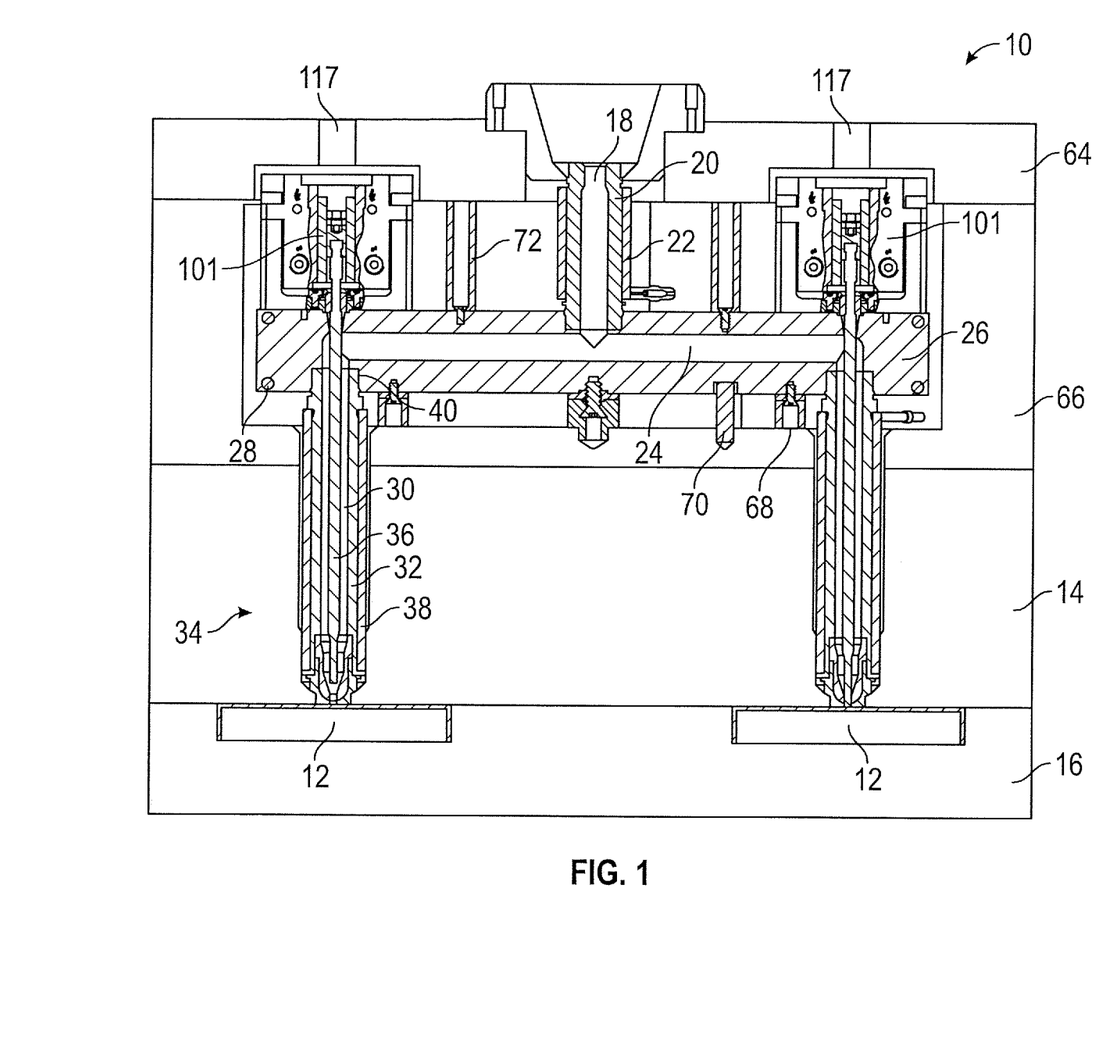
FIG. 1 is an elevational cross-section of an apparatus in accordance with this disclosure.

Shown in FIG. 1 is a hot-runner assembly 10 for use in delivering liquid resin (typically a molten thermoplastic composition) from an injection molding machine (not shown) to a mold cavity 12 defined by mold plates 14, 16. The resin flows from the injection molding machine into a channel 18 disposed in a sprue bushing 20 heated by electrical resistance heating element 22 and is distributed through manifold channels 24 defined in heated (or heatable) manifold 26. The heated manifold is provided with electrical resistance heating elements 28 capable of maintaining the resin at a desired temperature that facilitates flow. The resin flows from the manifold channels 24 into an annular space 30 defined between internal walls 32 of nozzles 34 and a valve pin 36 that is linearly movable within nozzle 34 along a longitudinal axis of the nozzle between an open position (shown for the nozzle on the left in FIG. 1) and a closed position (shown for the nozzle on the right in FIG. 1). When the valve pin 36 is in the open position, liquid resin (e.g., molten thermoplastic) flows into mold cavity 12. Nozzles 34 are maintained at a temperature sufficient to keep the resin in a liquid (flowable) state by electrical resistance heating elements 38. Nozzles 34 can be provided with external threads 40 on the inlet end of the nozzle which engage internal threads of a bore through the bottom of manifold 26 to provide a fluid-tight seal. The mold can define a single cavity or multiple cavities, and each cavity can be supplied with resin from a single nozzle or multiple nozzles.

The position and rate of movement of valve pins 36 are controlled by an actuator 100. Actuator 100 includes a body and/or housing for an electric motor 101 and converts rotational movement of the electric motor into linear movement (up and down in FIG. 2) of a drive shaft 102 (e.g., an externally threaded shaft having a cylindrical longitudinal bore inside), which in the illustrated example has an elongate internally threaded bore 104 going through the whole length of the drive shaft. Rotation of rotor 101R relative to stator 101S around axis 105 (FIG. 6) can be converted to linear movement of drive shaft 102 such as by providing threaded structure on the rotor that directly or indirectly (e.g., planetary roller screw mechanism) engages external threads on drive shaft 102. The extent of travel of drive shaft 102 can be limited to the confines of the body of actuator 100. Bore 104 has a central axis 105 coincident with the central axis of pin 36 and nozzle 34. The body and/or housing of actuator 100 has a bottom opening 107 and a top opening 109 that allows access to threaded bore 104 to allow an externally threaded valve pin nut 106 to be threaded into bore 104 from both directions. A lock nut 108 can be threaded into bore 104 from the top opening to lock the position of valve pin nut 106 and valve pin 36 after it has been adjusted. A lower end of valve pin nut 106 has an inwardly projecting semi-circumferential rim 111 that engages a circumferential groove 112 at an upper end of valve pin 36 to secure valve pin 36 to valve pin nut 106. An opening in the rim allows the valve pin 36 to be inserted into valve pin nut 106. The threaded connection between valve pin nut 106 and drive shaft 102 can be replaced with a fixed or other connection between the drive shaft 102 and valve pin nut 106, although this would eliminate the possibility of manually adjusting the valve pin position (as described below).

Figure 2:
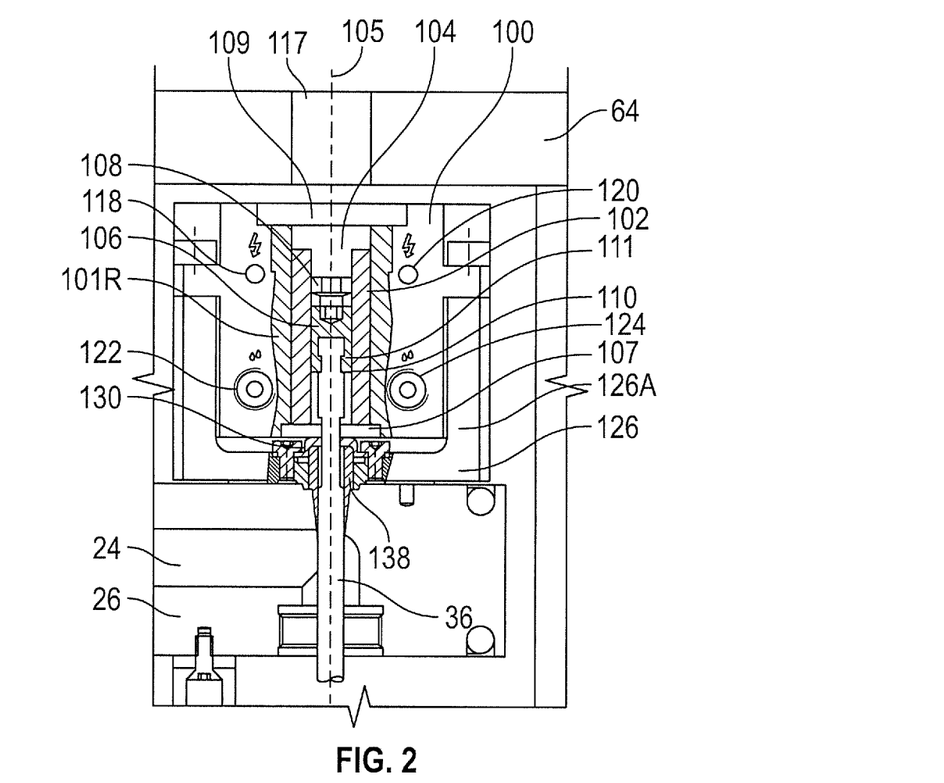
FIG. 2 is an enlarged view of the actuator and a portion of the hot-runner manifold on which the actuator is supported.

Notably, the pin head 110 is coupled to valve pin nut 106, which is fixed within elongated internally threaded bore 104 of drive shaft 102, such that the head 110 of valve pin 36 is directly or indirectly coupled to the drive shaft within a cylindrical space defined by the interior radial boundaries of the rotor and opposite ends of the rotor.

Valve pin nut 106 can have a tool-head engagement structure 114 that can be engaged by a tool, such as an Allen wrench to allow manual adjustment of the position of valve pin nut 106 and pin 36. Similarly, lock nut 108 has a tool-head engagement structure and bore 116 to allow tightening of lock nut 108 against valve pin nut 106 using a tool such as an Allen wrench to keep the valve pin nut 106 from moving or rotating. In the illustrated embodiment, engagement structures 114 and 116 are hexagonal sockets. However, other shapes or tool-engagement means are possible. Top plate 64 can be provided with openings or bores 117 to allow access to tool engagement structure (e.g., sockets 114, 116) to facilitate manual adjustment of the valve pin position without removal of plate 64 or disassembly of hot-runner assembly 10. This arrangement can be employed with an electric, pneumatic or hydraulic actuator.

Electrical connectors 118, 120 are provided for powering and controlling the electric motor, and/or to power and receive signals from an encoder that tracks drive shaft position.

Actuator 100 can be provided with an integral cooling plate having a coolant inlet port 122 and a coolant outlet port 124 to allow a coolant (e.g., chilled water or oil) to be circulated through the body and/or housing of the actuator to protect the motor against degradation or failure caused by overheating. Integration of the cooling block into the actuator body also simplifies assembly and disassembly of an injection molding apparatus.

Figure 3:
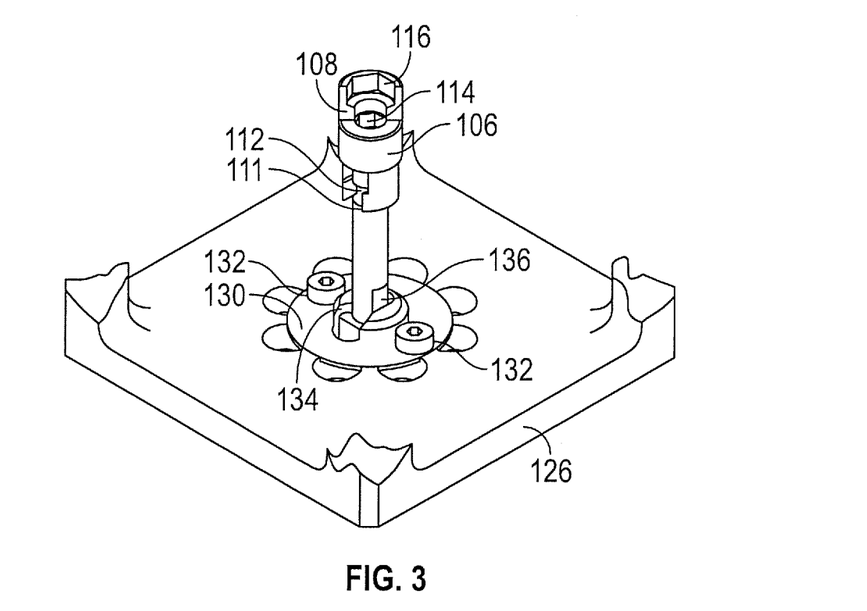
FIG. 3 is a perspective view of an actuator support and mechanism for fixing the valve pin to a linear drive shaft.

Actuator 100 can be supported on an insulating support plate 126 (see FIG. 3). Support plate 126 can, and preferably does, have a relatively low thermal conductivity. Preferred materials for support plate 126 are stainless steel and titanium or other material having a thermal conductivity equal to or less than the thermal conductivity of titanium. Support plate 126 can be releasably secured to manifold 26, such as with screws or bolts (not shown).

When assembled, the upper end of valve pin 36 extends into bore 104 through openings in manifold 26, support plate 126 and the body or housing of actuator 100 to provide a vertically compact design for mold 10.

Optionally, an anti-rotation disc or guide 130 (FIGS. 7A-7D) can be releasably secured to support plate 126 with bolts 132. Part 130 has an aperture (e.g., keyhole design) 134 for passage of valve pin 36. Aperture 134 has a shape configured to engage a section of valve pin 36 having a non-circular profile (e.g., parallel flats that fit the key hole) to prevent rotation of the pin around the longitudinal axis of the pin 36 and nozzle 34. In the illustrated embodiment, the non-circular profile includes two opposing flat or planar surfaces 136 (one of which is shown in FIG. 3). While flat surfaces 136 are engaged by straight edges 134 of an aperture through the anti-rotation part 130 of the illustrated embodiment, other anti-rotational means can be provided, such as splines, grooves, and other structures that can prevent rotation of valve pin 36.

Figure 7A:
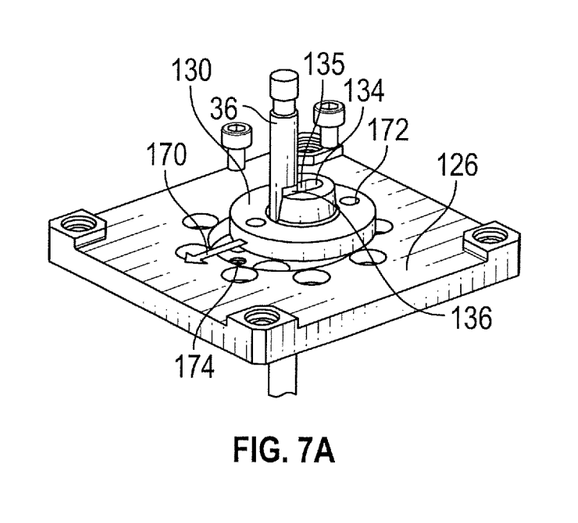
FIGS. 7A-7D illustrate a procedure for securing an anti-rotation device or part to a support plate mounted on a hot-runner manifold to prevent rotation of a valve pin.
Figure 7B:
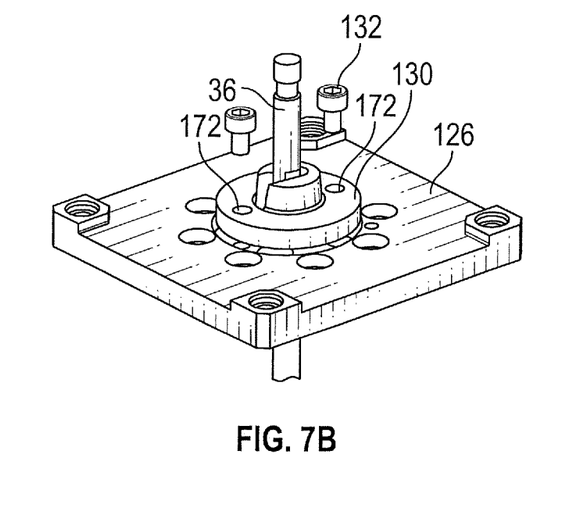
Figure 7C:
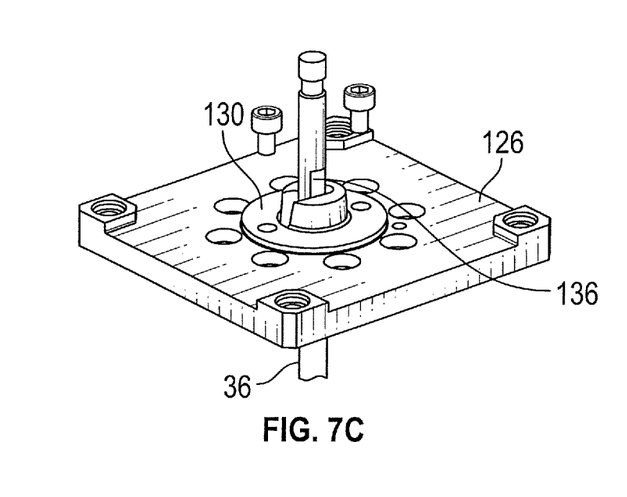
Figure 7D:
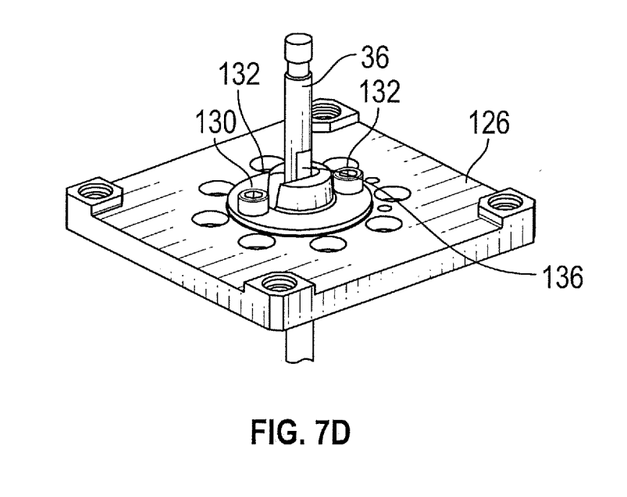

The procedure of securing anti-rotation part 130 to support plate 126 and engaging surfaces of part 130 with surfaces of pin 36 to prevent rotation of pin 36 is illustrated in FIGS. 7A-7D. The first step involves lowering part 130 onto support plate 126 with pin 36 extending through an enlarged section of aperture 134 of part 130 (FIG. 7A). The next step involves sliding part 130 in the direction indicated by arrow 170 in FIG. 7A with the flat surfaces 135 of aperture 134 engaging the flat surfaces 136 of pin 36 (as shown in FIG. 7B). It may be necessary to rotate part 130 and pin 36 together while in the conformation shown in FIG. 7B so that fastener openings 172 through part 130 are aligned with threaded bores 174 in the upper surface of support plate 126. Then fasteners 132 are aligned with openings 172 (FIG. 7C) and threaded into bores 174 (FIG. 7D).

Manifold 26 and actuators 100 are located in a space generally bounded by a top mold plate 64 and an intermediate mold plate 66.

Assembly 10 can also include various lower support elements 68, dowels 70, and upper support elements 72 for facilitating proper alignment and spacing of the components of the assembly.

A pin seal 138 prevents liquid resin from leaking upwardly from channel 24 of manifold 26.

The disclosed apparatus allows adjustment of the valve pin using dedicated tools/wrenches etc. from the back side of the actuator (facing the mold back plate 64) (opposite valve pin or valve pin elongation side).

The disclosed apparatus can allow coupling and decoupling of the actuator axially to the valve pin (by screwing down the valve pin nut 106 while lifting the actuator straight up which doesn't interfere with adjacent actuators).

The valve pin can be suspended within the height of the actuator. In particular, the valve pin can be directly or indirectly coupled to the drive shaft of the actuator within a volume radially inward of the rotor of the electric motor to provide an extremely compact design that maximizes design flexibility and minimizes labor during assembly and disassembly of the injection molding apparatus.

Figure 8:
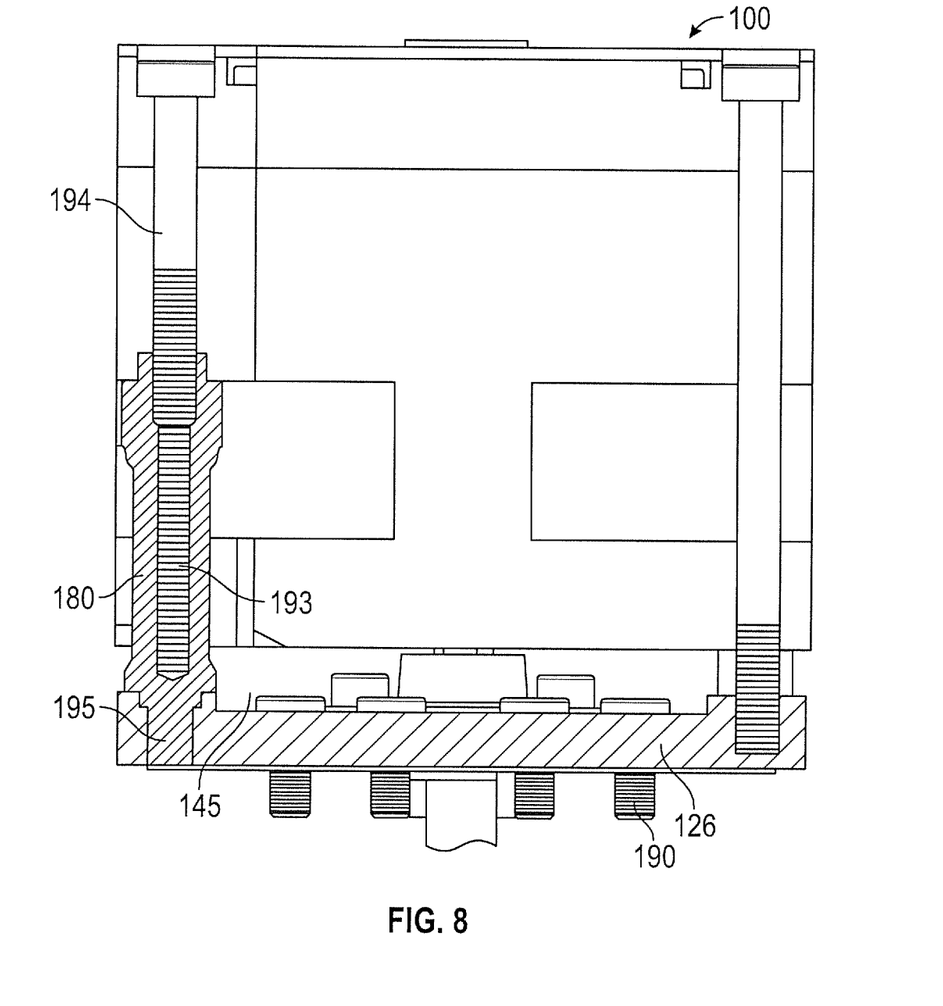
FIG. 8 is a partial cross-sectional view of an actuator mounting assembly that provides improved heat management.

The disclosed apparatus can also allow mounting of the actuator axially to the valve pin on a thermal insulation support plate in direct contact to the hot-runner manifold; wherein the support plate can have integrated or extra support columns 180 that can protrude along the actuator corners (FIG. 8).

Figure 4:
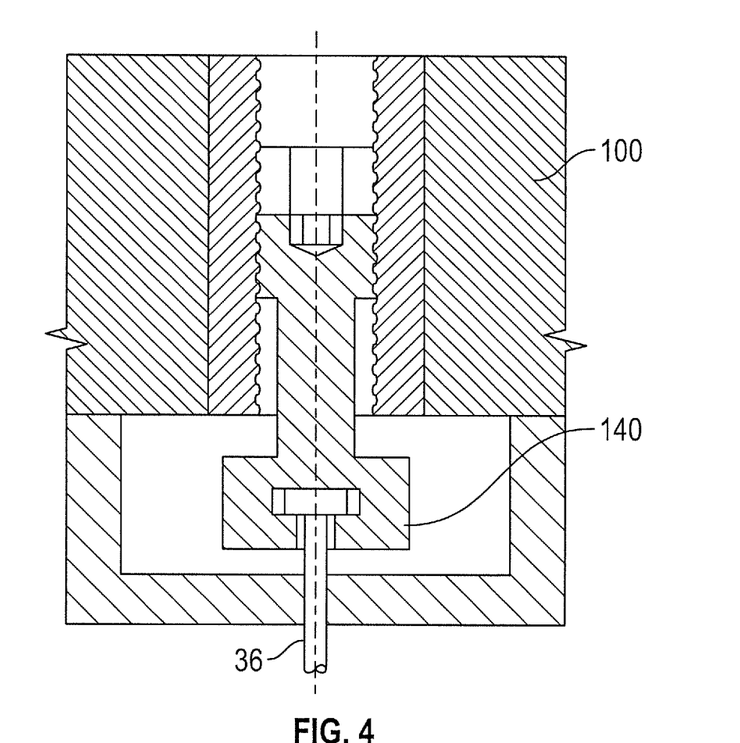
FIG. 4 is an enlarged cross-sectional view of an alternate embodiment in which the valve pin is indirectly coupled to the actuator drive shaft via a valve pin extension.

Shown in FIG. 4 is an alternative arrangement in which the valve pin 36 is indirectly coupled to drive shaft 102 (rather than directly as shown in FIGS. 1 and 2) by a valve pin extension 140 outside the actuator or motor (not as compact as our design).

The actuator 100 can be installed and coupled to the valve pin 36 axially, i.e., without moving the actuator laterally away from axis 105. This can be accomplished by first positioning the valve pin through the manifold and into the associated nozzle with an upper end of the valve pin projecting upwardly from the top of the manifold (i.e., the surface opposite the surface from which the nozzles extend). Thereafter, support plate 126 can be attached to the manifold (such as with screws) and anti-rotation disc can be positioned around valve pin 36 and secured to the support with bolts 132. Next, valve pin nut 106 can be positioned onto the head (top end) of valve pin 36. Actuator 100 is then positioned with the bore of drive shaft 110 in axial alignment with the valve pin. The tool engagement structure of valve pin nut 106 can then be accessed via the top opening 109 of actuator 100 with a tool to rotate valve pin nut 106 and thread nut 108 into the threaded bore 104 of drive shaft 102.

Figure 7E:
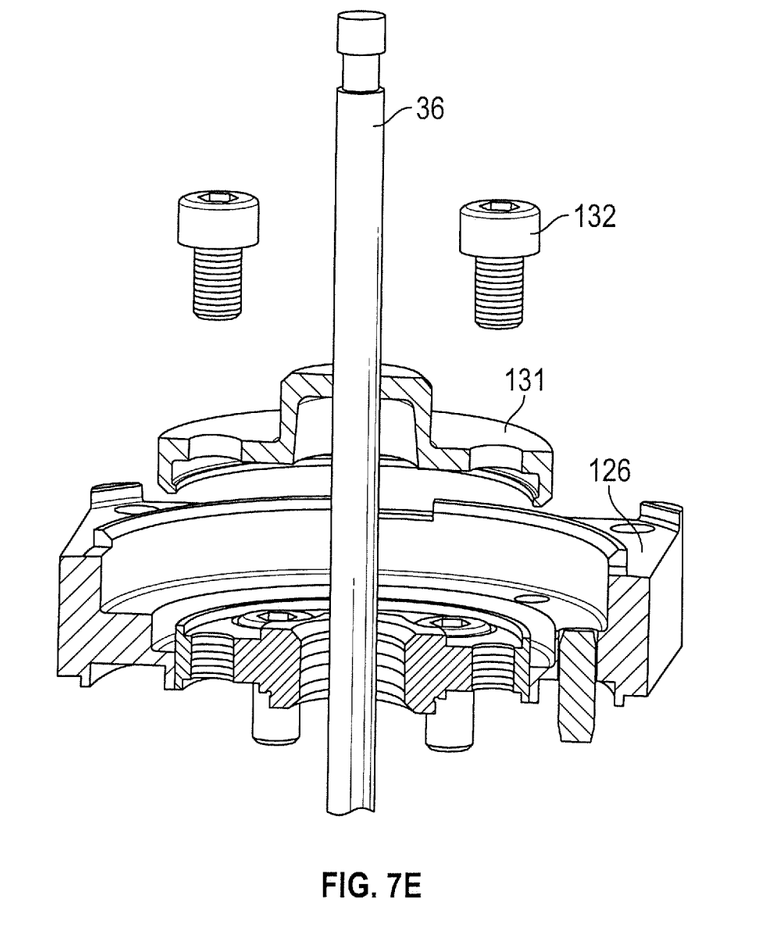
FIG. 7E illustrates an alternative non-anti-rotation configuration.

Alternatively, as shown in FIG. 7E, a non-anti-rotation configuration can be employed.

Figure 5:
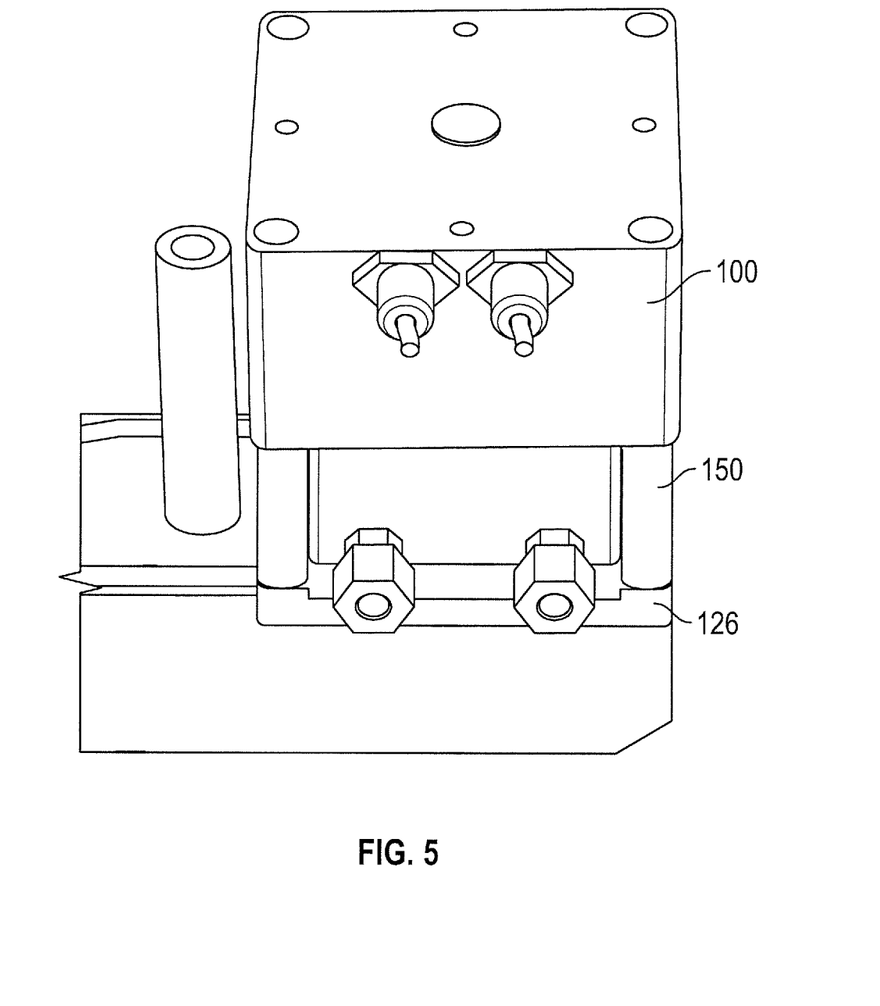
FIG. 5 is a perspective view of the actuator.
Figure 6:
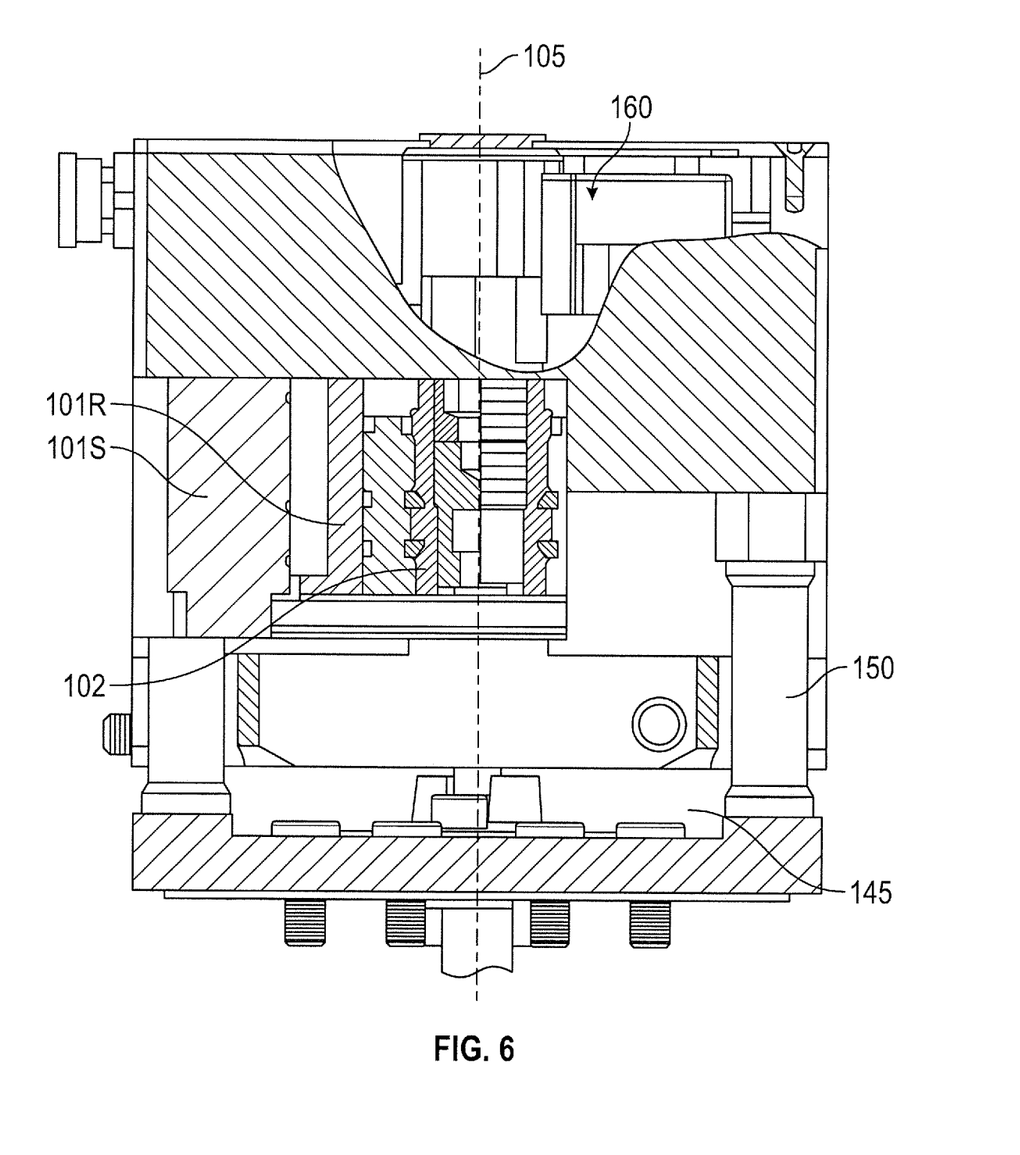
FIG. 6 is a cross-sectional perspective showing a contactless linear position sensor mounted within the actuator body to provide a compact actuator assembly that facilitates precise flow control.

As illustrated most clearly in FIGS. 5 and 6, actuator 100 can be supported on support plate member 126 with a space or gap 145 between a bottom surface of the actuator and an upper surface of the insulating support member. Supports 126a can be integrally machined on member 126 (FIG. 2), or formed as separate components 150 (FIGS. 5 and 6) to better facilitate manufacturing and reduce waste. Both support plate 126 and support columns 150 (or 126a) are preferably made of stainless steel, titanium, or other material exhibiting a low thermal conductivity. This structure provides sufficient separation between the hot-runner manifold 26 and actuator 100, and avoids direct contact between the actuator housing and the hot surface like the manifold or the support plate such that both thermal loads and mechanical loads on the integral cooling block or the actuator housing with separate cooling are minimal.

The use of a compact linear position sensor 160 within the body of actuator 100 is illustrated in FIG. 6. The sensor is positioned on a side (above in the drawing) of the motor opposite the side of the housing closest to the hot-runner manifold to reduce exposure of the sensor to high temperatures. Additional cooling strategies can be used/considered for applications with high mold temperatures such as a cooling plate on the top of the actuator or if the mold is cold enough the actuator just needs to have contact to the mold in the back area to indirectly cool the actuator from the back side. Sensor 160 is preferably a contactless position sensor such as an inductive sensor (e.g., commercially available from Cambridge Integrated Circuits Ltd., Cambridge, United Kingdom), a magnetic Hall effect contactless linear position sensor (e.g., commercially available from Active Sensors Inc., Indianapolis, Indiana), etc. Optical sensors or potentiators may also be employed to detect the position of pin 36. Sensor 160 can be positioned and configured to precisely determine the position of valve pin 36 to allow precise control of resin flow into a mold using a highly compact and reliable actuator unit, preferably having integral cooling and contactless linear position sensing means. Sensor 160 can be used with pneumatic or hydraulic actuators, as well as electric actuators. Sensor 160 can be an absolute position sensor.

Shown in FIG. 8 is an actuator 100 that is mounted in a manner that reduces heat transfer from a hot-runner manifold (not shown in FIG. 8) on which the actuator is mounted. A support plate 126 is fastened directly to the hot-runner manifold (such as with fasteners 190). Separate (i.e., non-integral) support columns 180 support actuator 100 in spaced relationship to support plate 126, such that an air gap 145 is located between the underside of the actuator housing and support plate 126. Support plate 126 and/or support columns 180 can be formed of a material having a low thermal conductivity (e.g., titanium or stainless steel, or possibly a ceramic material). A bore 193 extends axially through a majority of the length of support column 180, whereas threaded fastener 194 is of a length such that it can only be threaded into a minority of the length of the bore, whereby the resulting air gap or void reduces heat transfer along support column 180 and fastener 194. The end 195 of support column 180 coupled to plate 126 can be externally threaded to mate with internal threads of a bore extending through support plate 126, with the threaded end 194 being a larger diameter than the diameter of bore and fastener 194 to prevent loosening of support column 180 from support plate 126 when fastener 194 is loosened from threaded bore 193.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

The invention claimed is:

1. An injection molding apparatus, comprising:
   a hot-runner manifold having a resin channel for conveying a resin melt toward a mold cavity;
   a nozzle for conveying the resin melt to a mold cavity of a mold tool;

a valve pin linearly movable along a longitudinal axis of the nozzle to control flow of the resin melt through the nozzle and into the mold cavity;

an electric actuator having a housing containing a stator, a rotor, and a transmission for converting rotary movement of the rotor into linear movement of a traveling drive shaft along a rotational axis of the rotor and within a cylindrical space defined by an inner boundary of the rotor and opposite ends of the rotor, wherein the drive shaft has an internally threaded bore, wherein a head of the valve pin is directly or indirectly coupled to the drive shaft within the cylindrical space by a valve pin nut; and an externally threaded lock nut threadingly engaging the internally threaded bore and disposed adjacent a side of the valve pin nut opposite the valve pin.

2. The apparatus of claim 1, wherein the electric actuator housing has a top opening and a bore extending through the length of the drive shaft to allow manual adjustment of the valve pin position and removal of the valve pin in both directions.

3. The apparatus of claim 1, wherein the electric actuator is mounted on a minimum of one support attached directly or indirectly to a support plate which is directly or indirectly mounted to a manifold.

4. The apparatus of claim 1, wherein the electric actuator body includes an integral cooling block having a fluid conduit for circulating a liquid coolant.

5. The apparatus of claim 3, wherein the support and or support plate is comprised of stainless steel.

6. The apparatus of claim 3, wherein the support and or support plate is comprised of titanium or other material having a thermal conductivity less than or equal to the thermal conductivity of titanium.

7. The apparatus of claim 2, wherein the bore extending through the drive shaft is at least partially internally threaded and the valve pin is directly or indirectly coupled to the drive shaft via an externally threaded valve pin nut threadingly engaging the internally threaded bore.

8. The apparatus of claim 1, wherein the valve pin nut has a tool-head engagement structure for manual positioning of the valve pin and valve pin nut with respect to the drive shaft.

9. The apparatus of claim 1, wherein the lock nut has a tool-head engagement structure for manual tightening of the lock nut against the valve pin nut.

10. An injection molding apparatus, comprising:
a hot-runner manifold having a resin channel for conveying a resin melt toward a mold cavity;
a nozzle for conveying the resin melt to a mold cavity of a mold tool;
a valve pin linearly movable along a longitudinal axis of the nozzle to control flow of the resin melt through the nozzle and into the mold cavity;
an electric actuator having a housing containing a stator, a rotor, and a transmission for converting rotary movement of the rotor into linear movement of a traveling drive shaft along a rotational axis of the rotor and within a cylindrical space defined by an inner boundary of the rotor and opposite ends of the rotor, wherein the drive shaft has an internally threaded bore, wherein a head of the valve pin is directly or indirectly coupled to the drive shaft within the cylindrical space by a valve pin nut; and comprising an externally threaded lock nut threadingly engaging the internally threaded bore and disposed adjacent a side of the valve pin nut opposite the valve pin, wherein the electric actuator is mounted on one or several supports attached directly or indirectly via a support plate to the manifold, and further comprises an anti-rotation part disposed between a bottom of the support plate or the manifold and the electric actuator and releasably attached to the bottom of the support plate or the surface of the manifold, the anti-rotation part having an aperture for passage of the valve pin, the aperture having a shape configured to engage a section of the valve pin having a non-circular profile to prevent rotation of the pin around the longitudinal axis of the nozzle.

11. The apparatus of claim 3, wherein the actuator is positioned on the support plate or the manifold to provide a gap between a surface of the actuator housing facing the hot-runner manifold and a surface of the support plate facing the actuator housing.

12. The apparatus of claim 1, wherein a contactless linear position sensor is located in the actuator housing and is configured to monitor position of the valve pin to facilitate precise control of resin flow to a mold cavity.

13. The apparatus of claim 12, wherein the contactless linear position sensor is an absolute position sensor.

14. The apparatus of claim 12, wherein the sensor is an inductive linear position sensor.

15. The apparatus of claim 12, wherein the sensor is a Hall effect linear position sensor.

16. The apparatus of claim 12, wherein the sensor is an optical sensor.

17. The apparatus of claim 12, wherein the sensor is a potentiometer.

18. An injection molding apparatus, comprising:
a hot-runner manifold having a resin channel for conveying a resin melt toward a mold cavity;
a nozzle for conveying the resin melt to a mold cavity of a mold tool;
a valve pin linearly movable along a longitudinal axis of the nozzle to control flow of the resin melt through the nozzle and into the mold cavity;
an actuator having a housing containing an electric motor having a drive shaft coupled to the valve pin by a valve pin nut, wherein the drive shaft has an internally threaded bore, and an integral cooling block contained within the housing and having a fluid conduit for circulating a liquid coolant; and comprising an externally threaded lock nut threadingly engaging the internally threaded bore and disposed adjacent a side of the valve pin nut opposite the valve pin.

19. An injection molding apparatus, comprising:
a hot-runner manifold having a resin channel for conveying a resin melt toward a mold cavity;
a nozzle for conveying the resin melt to a mold cavity of a mold tool;
a valve pin linearly movable along a longitudinal axis of the nozzle to control flow of the resin melt through the nozzle and into the mold cavity;
an electric actuator having a housing containing an output drive shaft coupled to the valve pin; and
wherein the electric actuator is mounted on one or several supports attached directly or indirectly via a support plate to the manifold, and further comprises an anti-rotation part disposed between a bottom of the support plate or the manifold and the electric actuator and releasably attached to the bottom of the support plate or the surface of the manifold, the anti-rotation part having an aperture for passage of the valve pin, the aperture having a shape configured to engage a section of the valve pin having a non-circular profile to prevent rotation of the pin around the longitudinal axis of the nozzle.

20. The apparatus of claim 19, wherein the insulating support and or support plate is made of stainless steel or titanium.

21. The apparatus of claim 19, wherein each of the support columns has a bore extending axially through a majority of a length of the column, the bore being threaded along at least a part of a length of the bore to allow a threaded fastener to be threaded into a minority of the length of the bore, whereby a void can be provided within the bore to reduce heat transfer along the column.

22. The apparatus of claim 19, further comprising a contactless linear position sensor in or adjacent the housing and configured to monitor a position of the valve pin to facilitate precise control of resin flow to a mold cavity.

23. The apparatus of claim 22, wherein the sensor is an inductive linear position sensor or a Hall effect linear position sensor.

24. The apparatus of claim 22, wherein the sensor is an optical sensor.

25. The apparatus of claim 22, wherein the sensor is potentiometer.

26. The apparatus of claim 1, wherein the valve pin is suspended within the height of the actuator.

27. The apparatus of claim 16, wherein the valve pin is directly or indirectly coupled to the drive shaft of the actuator within a volume radially inward of the rotor of the electric motor.

28. An injection molding apparatus, comprising:
a hot-runner manifold having a resin channel for conveying a resin melt toward a mold cavity;
a nozzle for conveying the resin melt to a mold cavity of a mold tool;
a valve pin linearly movable along a longitudinal axis of the nozzle to control flow of the resin melt through the nozzle and into the mold cavity;
an electric actuator having a rotor and a drive having a internally threaded bore, the valve pin directly or indirectly coupled to the drive by a valve pin nut within a volume radially inward of the rotor; and comprising an externally threaded lock nut threadingly engaging the internally threaded bore and disposed adjacent a side of the valve pin nut opposite the valve pin.

29. An injection molding apparatus, comprising:
a hot-runner manifold having a resin channel for conveying a resin melt toward a mold cavity;
a nozzle for conveying the resin melt to a mold cavity of a mold tool;
a valve pin linearly movable along a longitudinal axis of the nozzle to control flow of the resin melt through the nozzle and into the mold cavity;
an electric actuator having a housing, a bore extending through the housing along the longitudinal axis, a linear driver having a threaded bore concentric with the longitudinal axis, and an externally threaded valve pin nut threaded into the bore and having a rim that engages a groove of the valve pin to secure the valve pin to the valve pin nut, and
wherein the electric actuator is mounted on one or several supports attached directly or indirectly via a support plate to the manifold, and further comprises an anti-rotation part disposed between a bottom of the support plate or the manifold and the electric actuator and releasably attached to the bottom of the support plate or the surface of the manifold, the anti-rotation part having an aperture for passage of the valve pin, the aperture having a shape configured to engage a section of the valve pin having a non-circular profile to prevent rotation of the pin around the longitudinal axis of the nozzle.

30. The injection molding apparatus of claim 29, wherein the valve pin nut includes a tool-head engagement structure to allow manual adjustment of a position of the valve pin nut and valve pin.

31. An injection molding apparatus, comprising:
a hot-runner manifold having a resin channel for conveying a resin melt toward a mold cavity;
a nozzle for conveying the resin melt to a mold cavity of a mold tool;
a valve pin linearly movable along a longitudinal axis of the nozzle to control flow of the resin melt through the nozzle and into the mold cavity;
an electric actuator having a housing containing a stator, a rotor, and a transmission for converting rotary movement of the rotor into linear movement of a traveling drive shaft along a rotational axis of the rotor and within a cylindrical space defined by an inner boundary of the rotor and opposite ends of the rotor, wherein a head of the valve pin is directly or indirectly coupled to the drive shaft within the cylindrical space;
wherein the electric actuator housing has a top opening and a bore extending through the length of the drive shaft to allow manual adjustment of the valve pin position and removal of the valve pin in both directions;
wherein the bore extending through the drive shaft is at least partially internally threaded and the valve pin is directly or indirectly coupled to the drive shaft via an externally threaded valve pin nut threadingly engaging the internally threaded bore;
wherein the valve pin nut has a tool-head engagement structure for manual positioning of the valve pin and valve pin nut with respect to the drive shaft; and
an externally threaded lock nut threadingly engaging the internally threaded bore and disposed adjacent a side of the valve pin nut opposite the valve pin.

* * * * *